No. 703,700. Patented July 1, 1902.
W. F. HALL.
TROLLEY WHEEL.
(Application filed Apr. 29, 1902.)
(No Model.)
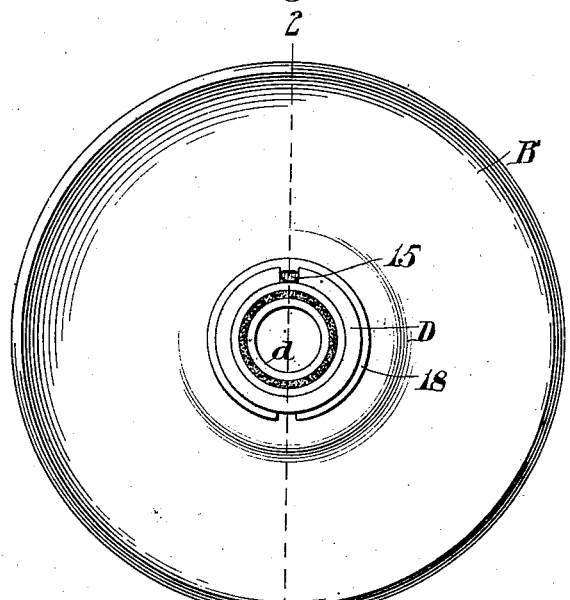
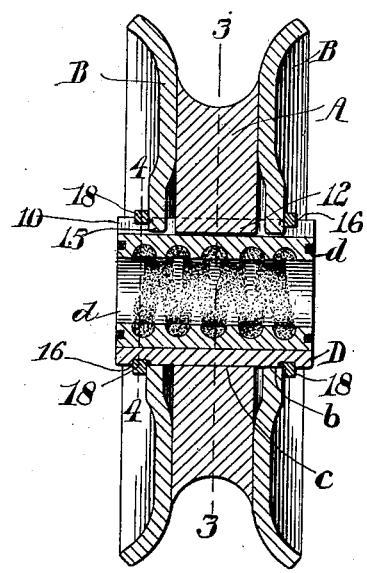
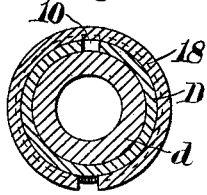
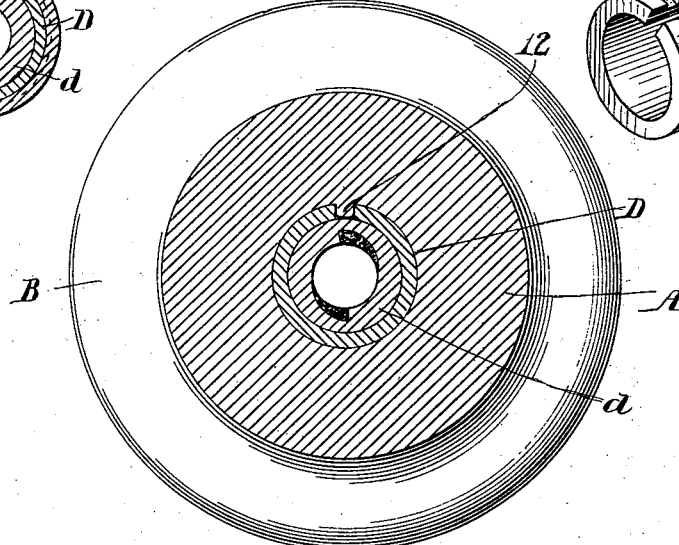
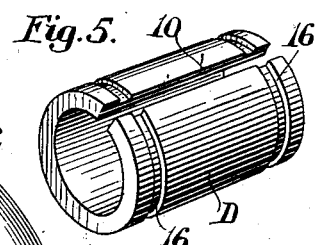
Witnesses:
Inventor:
William F. Hall,

UNITED STATES PATENT OFFICE.

WILLIAM F. HALL, OF BOSTON, MASSACHUSETTS.

TROLLEY-WHEEL.

SPECIFICATION forming part of Letters Patent No. 703,700, dated July 1, 1902.

Application filed April 29, 1902. Serial No. 105,205. (No model.)

*To all whom it may concern:*

Be it known that I, WILLIAM F. HALL, a citizen of the United States, residing at Boston, in the county of Suffolk and State of Massachusetts, have invented certain Improvements in Trolley-Wheels, of which the following is a specification.

My invention relates to separable trolley-wheels composed of a central grooved portion for contact with the trolley-wire, side disks or flanges arranged on opposite sides of the same, and a central sleeve or bushing forming a bearing for the axle. To provide a simple and reliable means for clamping and holding together the several parts or members of a wheel of this description is the object of my invention, which consists in the combination, with the central portion and side disks of a separable trolley-wheel, of a sleeve or hub inserted within the central bore of the wheel and held in place therein by a fastening device consisting of a removable divided ring or key embracing the end of the sleeve and fitting within an annular groove therein in such manner as to project over and lie against the outer face of the adjacent side disk, whereby the several parts or members of the wheel are securely clamped and held together without liability of becoming loosened or separated from each other, as hereinafter more fully set forth.

In the accompanying drawings, Figure 1 is a side elevation of a trolley-wheel constructed in accordance with my invention. Fig. 2 is a vertical section of the same on the line 2 2 of Fig. 1. Fig. 3 is a vertical section on the line 3 3 of Fig. 2. Fig. 4 is a sectional detail on the line 4 4 of Fig. 2. Fig. 5 is a perspective view of the central longitudinally-split hub or sleeve.

In the said drawings, A represents the central portion of a trolley-wheel, preferably composed of copper, bronze, or like metal having a high degree of conductivity and provided with a peripheral groove for contact with the trolley-wire, which is retained in place therein by side disks or flanges B B, preferably composed of steel and arranged on opposite sides of the central portion A, and each provided with a central opening $b$ coincident with the central bore $c$ of the portion A. Within the central bore $c$ is snugly fitted a sleeve D, forming a hub, said sleeve being preferably split longitudinally at 10 and being spread and forced tightly against the walls of the bore $c$ by an antifriction-bushing $d$, slightly tapered and forcibly driven therein. Projecting into the bore of the central portion A is a lug or projection 12, adapted to fit within the longitudinal opening 10, formed between the opposite edges of the split sleeve D, and within the central opening of each of the side disks is a similar lug or projection 15, which also extends into the opening 10, the rotary movement of the parts independently of the hub being thus prevented. The outer ends of the sleeve D, which extend through the side disks B B and beyond the central openings of the same, are each provided with an annular groove 16 for the reception of a removable divided spring-steel ring or key 18, which embraces the end of the hub and is sprung into place within its groove, so as to occupy the position shown in Figs. 1, 2, and 4, the ring being of greater thickness than the depth of the groove, so as to project beyond the same and overlap and lie against the outer face of the adjacent side disk B, these rings thus serving to clamp and hold the disks tightly against the central portion A and at the same time prevent any possible displacement of the hub or separation of the members or parts of the wheel. The grooves 16 are preferably made of greater width than the split ring 18, so as to lie partially within the openings of the side disks, in order to allow a slight outward wedging in opposite directions when the split rings are inserted within said grooves.

The antifriction-bushing $d$, which forms a bearing for the wheel-axle, may be of any suitable or approved construction, that here shown being provided with the usual interior and end grooves for containing graphite or other light powdered lubricant.

Instead of the sleeve or hub D being provided with an annular groove at each end, as shown, one end may be provided with a flange overlapping the outer face of the adjacent side disk, in which case a single divided ring or key only would be required to clamp the parts and hold them together.

A trolley-wheel constructed as above described is simple, cheap, and reliable and can be readily taken apart when the central conducting portion becomes worn and requires to be replaced.

What I claim as my invention, and desire to secure by Letters Patent, is—

1. In a separable trolley-wheel, the combination with the central portion and the disks arranged on opposite sides of the same, of a central sleeve or hub having at its end an annular groove, and a fastening device consisting of a divided ring or key inserted within said annular groove and bearing against the outer face of the adjacent side disk.

2. A separable trolley-wheel comprising a central portion, disks arranged on opposite sides of the same, a central longitudinally-split sleeve or hub inserted within the bore of the wheel and provided at its opposite ends outside said disks with annular grooves, a bushing inserted within said split hub and adapted to spread and force the same against the walls of the bore or central opening of the wheel within which it is placed, and divided rings or keys fitting within said annular grooves and overlapping and bearing against the outer faces of the adjacent side disks to clamp the same against the central portion and hold together the several parts of the wheel.

3. In a trolley-wheel, the combination with the central portion and removable disks or flanges arranged upon opposite sides of the same, said central portion and disks having their central openings each provided with an inwardly-projecting lug, of a central sleeve or hub split longitudinally and having a narrow opening between its opposite edges for the reception of said lugs and an annular groove at each end, a central bushing inserted within said split hub and adapted to spread and force the same against the walls of the bore or central opening of the wheel, and divided rings or keys fitting within the annular end grooves of the hub and bearing against the adjacent outer faces of the side disks or flanges to clamp the same against the central portion and hold together the several parts of the wheel.

Witness my hand this 26th day of April, A. D. 1902.

WILLIAM F. HALL.

In presence of—
P. E. TESCHEMACHER,
T. E. O'BRIEN.